Jan. 7, 1941. H. W. GREENUP ET AL 2,227,809
METHOD OF MAKING POROUS RUBBER ARTICLES
Filed Feb. 11, 1937
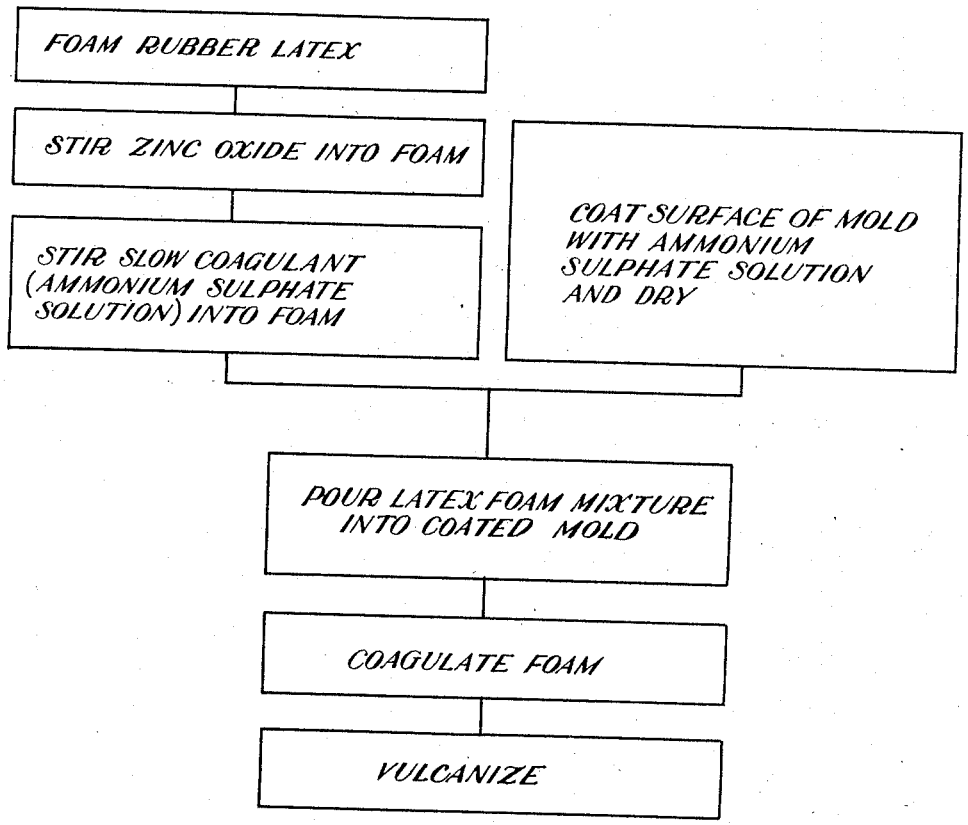
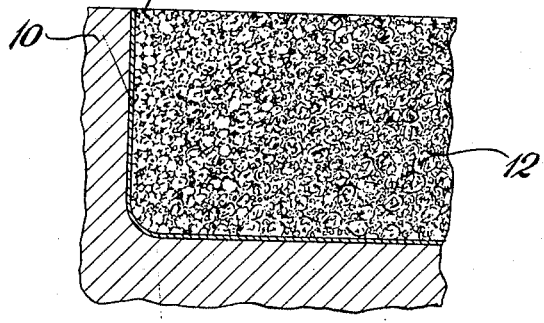
INVENTOR
Harold W. Greenup
AND
Baynard R. Whaley
BY
Albert L. Ely
ATTORNEY Patented Jan. 7, 1941

2,227,809

UNITED STATES PATENT OFFICE 2,227,809

METHOD OF MAKING POROUS RUBBER ARTICLES

Harold W. Greenup and Baynard R. Whaley, Akron, Ohio, assignors to The Firestone Tire & Rubber Company, Akron, Ohio, a corporation of Ohio Application February 11, 1937, Serial No. 125,267

4 Claims. (Cl. 18—58)

This invention relates to methods of making porous rubber articles, and more especially it relates to procedure for the manufacture of rubber articles of cellular or sponge-like structure from aqueous emulsions or dispersions of rubber, such as rubber latex.

In the manufacture of articles of the character mentioned, it is common practice to aerate or foam the natural rubber latex, then to stir into the foam a small quantity of activating material such as a dispersion of zinc oxide, and a small quantity of a coagulating agent such as ammonium sulphate, $(NH_4)_2SO_4$. The foam thus prepared is then poured into a mold wherein it rapidly coagulates or "sets," and thereafter is vulcanized by the application of heat in the usual manner. The resulting product, while highly porous interiorly, has been found to have a thin surface skin of lesser porosity, which skin is undesirable for the reason that it retards the washing and drying of the vulcanized article, and may even retain moisture in some of the cells of the article. Apparently the formation of the surface skin is the result of the bursting of the small bubbles in the foam as said bubbles come into contact with the metal of the mold, resulting in a denser mixture next to the mold that becomes a substantially impervious skin on the vulcanized structure.

The chief object of this invention is to provide an improved method of making porous rubber articles having uniform porosity throughout. More specifically the invention aims to produce porous vulcanized rubber articles that do not have a relatively impervious surface skin. Other objects will be manifest.

The foregoing objects are achieved by preventing the bursting of the minute bubbles of the latex froth in contact with the mold surface, and this result is accomplished by effecting a rapid, almost instantaneous, local coagulation or setting of the froth as it is poured into the mold. To this end the surface of molding cavity of the mold is treated with a coagulating agent such as ammonium sulphate. The latter is prepared as a 40% aqueous solution and is used in the manner of paint for coating the surface of the molding cavity. The coating is then allowed to dry so that the molding cavity will present a facing of crystalline ammonium sulphate, at full strength, to the latex subsequently poured thereinto. When the latex is poured into the mold, the local regions thereof in contact with the treated surface of the mold coagulate or set at once before there is any breaking down of the froth structure due to contact with the molding surface. In due time the remainder of the froth coagulates due to the presence of the coagulant that is stirred thereinto prior to its being placed in the mold. Thereafter the froth is vulcanized by the application of heat in the usual manner.

Attention is now directed to the accompanying drawing in which Figure 1 is a flow sheet disclosing the steps performed in practicing one concept of the invention; and Figure 2 is a vertical cross section of a corner of a mold treated in accordance with the invention.

Referring specifically to Figure 2, a mold 10 is shown which has a thin coating of a coagulant, such as ammonium sulfate, on its surface, the coating being obtained as described hereinabove. A volume of foamed latex 12 is held in the mold 10 and thereby contacts the ammonium sulfate layer 11. Figure 2 represents the condition of the foamed latex immediately after it is poured into the mold, prior to any coagulation occurring. The layer of the coagulant on the mold surface causes the portion of the foamed latex in contact therewith to coagulate substantially immediately upon insertion into the mold and thus prevents bursting of the minute bubbles of latex froth in contact with the mold surface whereby a porous surface is obtained on the rubber product.

The vulcanized article is of uniform porosity in that it does not have a relatively dense surface skin. Hence the article readily may be washed to remove residual fluid from its pores, and thereafter may be completely dried. The mold should be coated with the coagulant before each molding operation.

The method is simple in its operation and results in a superior product.

Modification may be resorted to without departing from the spirit of the invention or the scope of the appended claims.

What is claimed is:

1. The method of molding porous rubber articles from aqueous emulsions or dispersions thereof which comprises admixing a relatively small portion of a delayed action coagulating agent with a body of foamed aqueous dispersed rubber to effect relatively slow coagulation of the foam, and then subjecting the surface of the body when within a mold to the action of a concentrated coagulant to effect relatively rapid coagulation of the surface region of the body, which region of the foam is coagulated before the main body of the foam.

2. The method of molding porous rubber articles from an aqueous dispersion of rubber which comprises first coagulating the surface of a body of foam formed from said dispersion to prevent the breakdown of the porous surface structure, and then coagulating the body of the foam, both coagulating actions being effected within a mold.

3. A method of making massive porous rubber articles from a foam of an aqueous dispersion of rubber containing a delayed action coagulant which method comprises introducing a mass of the foam of the dispersion into the cavity of a mold, the inner surfaces of which are provided with a coating of a concentrated coagulant for the dispersion, coagulating the foam in contact with the surfaces of the mold before breakdown of its structure, and thereafter coagulating the inner mass of the foam by the delayed action coagulant to form the massive article.

4. A method of making thick cellular rubber articles having molded outer surfaces comprising placing a layer of a coagulant for a rubber dispersion onto the surfaces of a cavity in a mold, introducing a mass of foamed rubber dispersion containing a delayed action coagulant into the mold cavity, coagulating the outer surfaces of the mass of foam by the coagulant on the surfaces of the mold cavity before the foam in contact therewith breaks down, and thereafter coagulating the inner portion of the mass of foam by the delayed action coagulant to produce a cellular rubber article having a pervious molded outer surface.

HAROLD W. GREENUP.
BAYNARD R. WHALEY.